(12) United States Patent
Hsieh

(10) Patent No.: US 7,714,837 B2
(45) Date of Patent: *May 11, 2010

(54) ELECTRONIC BOOK READING APPARATUS AND METHOD

(75) Inventor: Kuan-Hong Hsieh, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 694 days.

This patent is subject to a terminal disclaimer.

(21) Appl. No.: 11/308,779

(22) Filed: May 3, 2006

(65) Prior Publication Data

US 2007/0048717 A1   Mar. 1, 2007

(30) Foreign Application Priority Data

Jun. 10, 2005   (CN) .......................... 2005 1 0035282

(51) Int. Cl.
*G09G 5/00* (2006.01)
(52) U.S. Cl. ....................... 345/156; 345/173
(58) Field of Classification Search .................. 345/87, 345/204, 156, 173
See application file for complete search history.

(56) References Cited

U.S. PATENT DOCUMENTS

| 4,159,417 A | 6/1979 | Rubincam |
| 5,847,698 A | 12/1998 | Reavey et al. |
| 5,909,207 A * | 6/1999 | Ho ............................. 345/156 |
| 6,229,502 B1 * | 5/2001 | Schwab ....................... 345/1.1 |
| 6,788,292 B1 * | 9/2004 | Nako et al. .................. 345/173 |
| 2003/0020687 A1 * | 1/2003 | Sowden et al. .............. 345/157 |
| 2003/0142081 A1 * | 7/2003 | Iizuka et al. ................ 345/173 |
| 2003/0227441 A1 * | 12/2003 | Hioki et al. ................. 345/156 |
| 2006/0279533 A1 * | 12/2006 | Hsieh ......................... 345/156 |

FOREIGN PATENT DOCUMENTS

CN   100350362   11/2007

* cited by examiner

*Primary Examiner*—Amr Awad
*Assistant Examiner*—Stephen G Sherman
(74) *Attorney, Agent, or Firm*—Winston Hsu

(57) ABSTRACT

An electronic book reading apparatus mainly includes a user interface, an operation controlling unit, and a display unit. The user interface allows a user to flip an appropriate number of pages of a displayed electronic book. The user interface includes a plurality of sensing units for generating sensing signals in response to the flipping operations. The operation controlling unit is used for determining a speed and direction of the flipping operations and generating a speed signal and a direction signal according to the sensing signals. The display unit receives the direction signal, flips the appropriate number of pages of the displayed electronic book in a corresponding direction according to the received speed signal and direction signal, and displays the resulting page of the electronic book after flipping. A related method is provided.

7 Claims, 3 Drawing Sheets

ELECTRONIC BOOK READING APPARATUS AND METHOD

TECHNICAL FIELD

The present invention relates to electronic book reading apparatuses and methods, and particularly to an electronic book reading apparatus and method having the feel of operating real paper books.

GENERAL BACKGROUND

As computer technology have developed and grown in popularity, electronic books and publications have also increased and are finding widespread acceptance in the general public. As opposed to books in paper form, electronic books are read on a corresponding electronic book reading apparatus that displays pages of information just as they would appear in a paper book, thereby reducing costs in printing, binding, warehousing, and distributing.

The electronic book reading apparatus is widely known. A typical one is a hand-held book device including a display device to display the text data and a user interface that allows a user to navigate through the text data. The display device and the user interface are incorporated in a hand-held housing to facilitate portability of the electronic book reading device.

Furthermore, many electronic book reading devices have the user interface in the form of one or more buttons. The user is required to depress a selected button to flip over pages. However, this operation manner is not intuitive, and thus the user may feel bothered with this operation manner.

What is needed, therefore, is an electronic book reading apparatus which provides a simple, intuitive, or efficient user interface for reading the electronic book.

SUMMARY

An electronic book reading apparatus is provided. The electronic book reading apparatus mainly includes a user interface, an operation controlling unit, and a display unit. The user interface is for allowing a user to intuitively flip an appropriate number of pages of a displayed electronic book. The user interface includes a plurality of sensing units for generating sensing signals in response to the user's flipping operations. The sensing units are respectively designated a coordinate for identifying itself. The operation controlling unit is for determining a speed and direction of the flipping operations and generating a speed signal and a direction signal according to the sensing signals. The display unit is for receiving the speed signal and direction signal, flipping the appropriate number of pages of the displayed electronic book in a corresponding direction according to the received speed signal and direction signal, and displaying the page of the electronic book after flipping.

A method for reading an electronic book is also provided. The method includes the steps of: (a) generating sensing signals in response to a user's flipping operation on a user interface, the user interface including a plurality of sensing units for generating the sensing signals; (b) determining a speed and direction of the user's flipping operation, according to the sensing signals; (c) flipping an appropriate number of pages in the electronic book to a corresponding direction, according to the speed and direction; and (d) displaying the resulting page of the electronic book after flipping.

Other advantages and novel features will be drawn from the following detailed description with reference to the attached drawing, in which:

DETAILED DESCRIPTION

Figure 1:
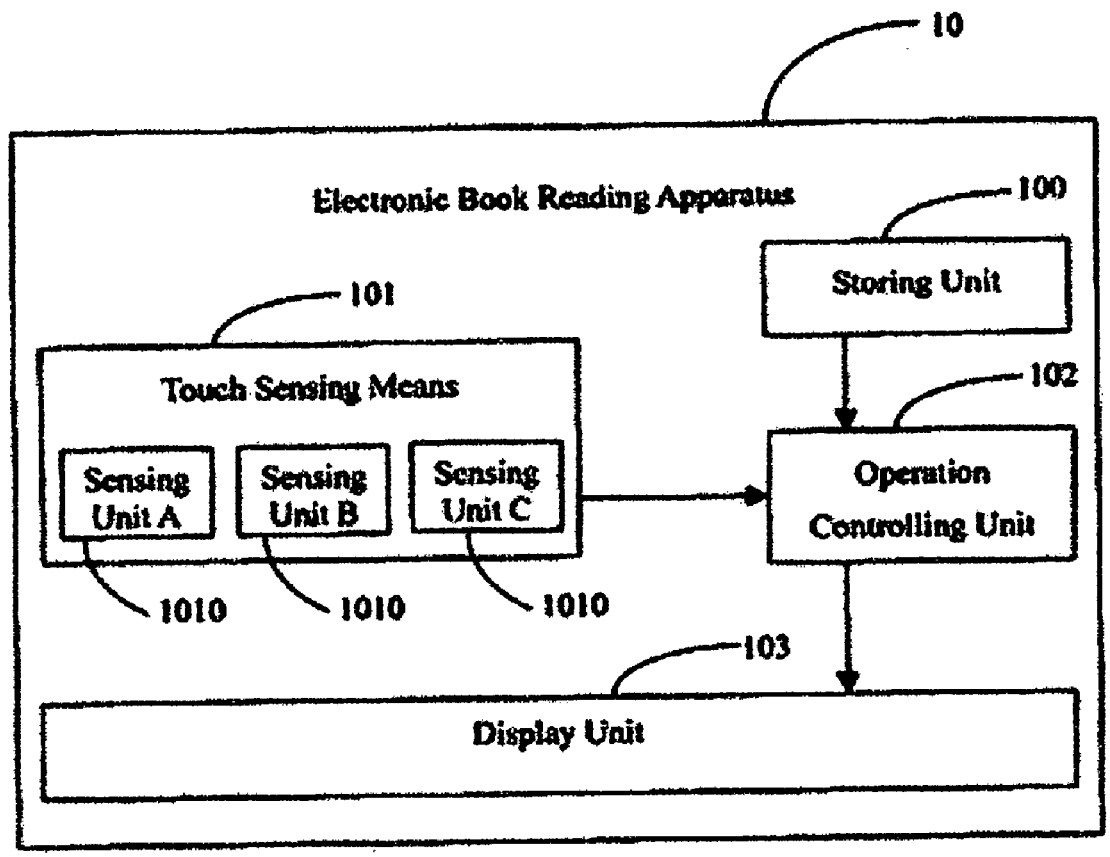
FIG. 1 is a schematic diagram of hardware infrastructure of an electronic book reading apparatus in accordance with a preferred embodiment of the present invention.

FIG. 1 is a schematic diagram of hardware infrastructure of an electronic book reading apparatus (hereinafter, "the apparatus") in accordance with a preferred embodiment of the present invention. The apparatus 10 mainly includes a storing unit 100, a user interface 101, an operation controlling unit 102, and a display unit 103.

The storing unit 100 is provided for storing electronic books. The user interface 101 is provided for allowing the user to intuitively flip an appropriate number of pages of a displayed electronic book 11 in a desired direction. Therefore, the user interface 101 is preferably designed with a touch sensing interface. Accordingly, in the preferred embodiment, a touch sensing means is designated as the user interface 101. The touch sensing means 101 includes a plurality of sensing units 1010 (only three shown and symbolically designated as sensing unit 'A', sensing unit 'B', and sensing unit 'C'). The sensing units 1010 are capable of generating sensing signals in response to the user's flipping operations. Furthermore, each sensing unit 1010 is designated a coordinate for identifying itself.

The operation controlling unit 102 is provided for scanning the sensing units 1010, detecting which sensing units 1010 generate sensing signals (that is which sensing units 1010 are touched or stroked), and determining a signal generating speed and a corresponding signal generating sequence among the detected sensing units 1010, thus determining a speed and direction of the user's flipping operational inputs according to the signal generating speed and the signal generating sequence of the detected sensing units 1010 to generate a corresponding speed signal and a direction signal.

For example, if the sensing unit 'A' is first touched, then the sensing unit 'B', and followed by the sensing unit 'C', the direction of the user's flipping operations (referred to FIG. 3) is determined as towards right and indicated by the corresponding direction signal (e.g., symbolically designated as direction signal 'd1'); likewise, if the sensing unit 'C' is first touched, then the sensing unit 'B', and followed by the sensing unit 'A', the direction of the user's flipping operations (referred to FIG. 3) is determined as towards left and indicated by the corresponding direction signal (e.g., symbolically designated as direction signal 'd2'). Concurrently, the speed of the user's flipping operation is mapped to an appropriate number of pages flipping. For example, when a duration of one flipping operational input is in a first predetermined time range, the speed thereof is a normal speed, the flipping operation is mapped to a single page flipping; when the duration of one flipping operation is in a second predetermined time range, the speed thereof is an excessive speed, the flipping operation is mapped to multiple or continuous pages flipping (i.e., riffling).

Consequently, the display unit 103 flips the appropriate number of pages of the displayed electronic book 11 in a corresponding direction according to the speed signal and the direction signal from the operation controlling unit 102, and displays the resulting page of the electronic book 11 after flipping. For example, when the speed signal indicates the normal speed and the direction signal is the direction signal 'd1', the display unit 103 flips a single page of the displayed electronic book 11 from left to right; when the speed signal indicates the excessive speed and the direction signal is the direction signal 'd2', the display unit 103 flips multiple or continuous pages of the displayed electronic book 11 from right to left, and displays the electronic book 11 after flipping, and the likewise. Therefore, by utilizing the touch sensing means as the user interface, the user can intuitively and efficiently flip an appropriate number of pages of the electronic book 11 in a desired direction that mimics the action one does when reading a paper book.

Figure 2:
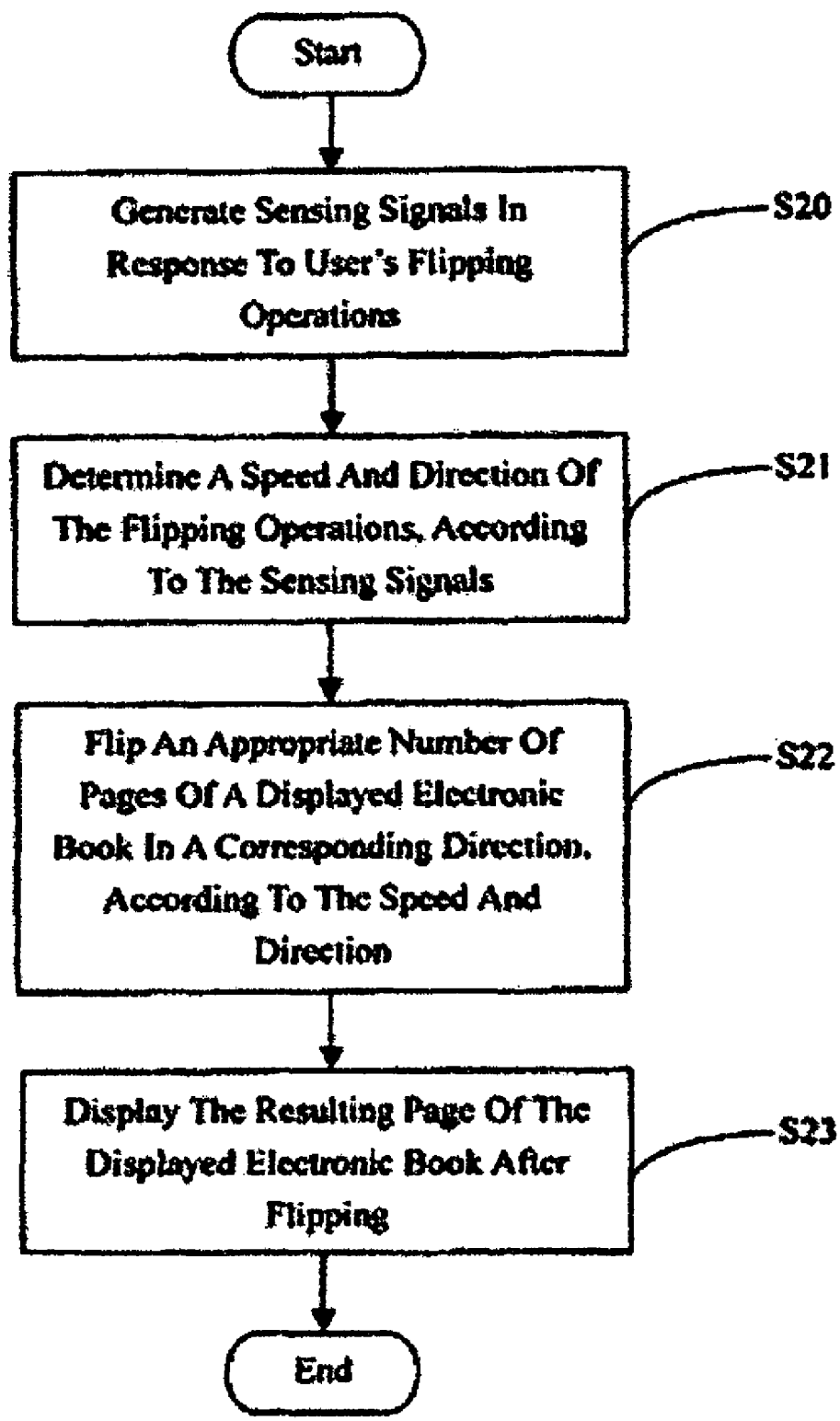
FIG. 2 is a flowchart of a preferred method for reading an electronic book by utilizing the apparatus of FIG. 1.

FIG. 2 is a flowchart of a preferred method for reading an electronic book by utilizing the apparatus of FIG. 1. In step S20, the sensing units 1010 touched generate sensing signals in response to the user's flipping operation. In step S21, the operation controlling unit 102 scans the sensing units 1010, detects which sensing units 1010 generate sensing signals (that is which sensing units 1010 are touched or stroked) and determines a signal generating speed and a corresponding signal generating sequence among the detected sensing units 1010, thus determining a speed and direction of one flipping operation according to the signal generating speed and the signal generating sequence of the detected sensing units 1010 to generate a corresponding speed signal and a direction signal. For example, when a duration of the user's flipping operation is in a first predetermined time range, the operation controlling unit 102 determines that the speed thereof is a normal speed and the user's flipping operation is mapped to a single page flipping; when the duration of the user's flipping operation is in a second predetermined time range, the operation controlling unit 102 determines that the speed thereof is an excessive speed and the user's flipping operation is mapped to multiple or continuous pages flipping (i.e., riffling). In step S22, the display unit 103 flips an appropriate number of pages of the displayed electronic book 11 (e.g., a single page, multiple or continuous pages) in a corresponding direction according to the speed signal and the direction signal from the operation controlling unit 102. In step S23, the display unit 103 displays the resulting page of the electronic book 11 after flipping.

Figure 3:
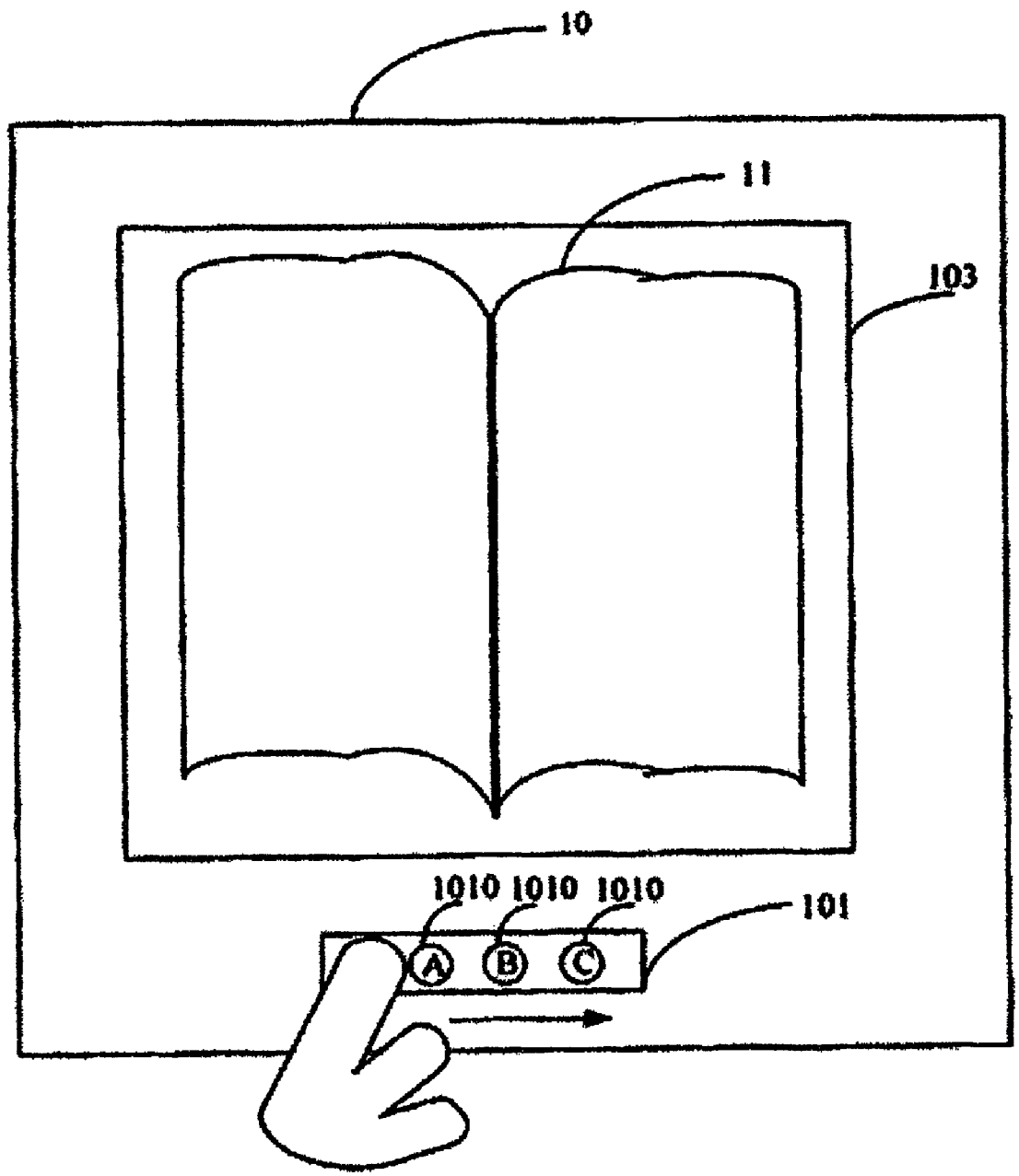
FIG. 3 is an exemplary schematic diagram illustrating a reading operation on an electronic book by utilizing the apparatus of FIG. 1.

FIG. 3 is an exemplary schematic diagram illustrating a reading operation on an electronic book by utilizing the apparatus of FIG. 1. As described above, the touch sensing means provides a plurality of sensing units 1010 (i.e., sensing unit 'A', sensing unit 'B', and sensing unit 'C') for generating sensing signals in response to the user' flipping operations. Accordingly, as the user strokes the touch sensing means with a particular speed (e.g., normal speed or excessive speed) and a direction to the right, the page of the displayed electronic book 11 is turned over a single page or multiple pages in the same direction. Thus, by utilizing the apparatus 10, the user intuitively, efficiently flips the displayed electronic book 11 in his or her desired speed and direction.

Although the present invention has been specifically described on the basis of a preferred embodiment and method thereof, the invention is not to be construed as being limited thereto. Various changes or modifications may be made to the embodiments without departing from the scope and spirit of the invention.

What is claimed is:

1. An electronic book reading apparatus comprising: a user interface allowing a user to flip an appropriate number of pages of a displayed electronic book, the user interface comprising a plurality of sensing units for generating sensing signals in response to the user's flipping operations; an operation controlling unit for determining a speed of the flipping operations according to only a duration of the sensing signals and a direction of the flipping operations according to a sensing signal sequence of the sensing signals and generating a speed signal and a direction signal; wherein when the duration of the flipping operation is in a first predetermined time range, the operation controlling unit determines the speed of the flipping operation is mapped to a single page flipping; when the duration of the flipping operation is in a second predetermined time range, the operation controlling unit determines the speed of the flipping operation is mapped to multiple or continuous pages flipping; and a display unit for receiving the speed signal and the direction signal, flipping the appropriate number of pages of the displayed electronic book in a corresponding direction according to the received speed signal and direction signal, and displaying the resulting page of the electronic book after flipping.

2. The electronic book reading apparatus according to claim 1, further comprising a storing unit for storing the electronic book.

3. The electronic book reading apparatus according to claim 2, wherein each of the sensing units is designated a coordinate for identification.

4. The electronic book reading apparatus according to claim 3, wherein the operation controlling unit determines the direction of the flipping operations according to the coordinates of the sensing units which generate the sensing signals.

5. A method for reading an electronic book, the method comprising the steps of: generating sensing signals in response to a flipping operation on a user interface, the user interface comprising a plurality of sensing units for generating the sensing signals; determining a speed of the flipping operation according to only a duration of the sensing signals and a direction of the flipping operation according to a sensing signal sequence of the sensing signals; wherein when the duration of the flipping operation is in a first predetermined time range, the speed of the flipping operation is mapped to a single page flipping; when the duration of the flipping operation is in a second predetermined time range, the speed of the flipping operation is mapped to multiple or continuous pages flipping; flipping an appropriate number of pages in the electronic book in a corresponding direction, according to the speed and the direction of the flipping operation; and displaying the resulting page of the electronic book after flipping.

6. The method according to claim 5, wherein each of the sensing units is designated a coordinate for identification.

7. The method according to claim 6, wherein the direction of the user's flipping operation is further determined according to the coordinates of the sensing units that generate the sensing signals.

* * * * *